(12) United States Patent
Chou et al.

(10) Patent No.: US 12,457,221 B2
(45) Date of Patent: Oct. 28, 2025

(54) COMMUNICATION DEVICE AND METHOD FOR ACCELERATING DEVICE DISCOVERY AND IDENTIFICATION

(71) Applicant: Realtek Semiconductor Corp., HsinChu (TW)

(72) Inventors: Yu-Fei Chou, HsinChu (TW); Yang-Lin Cheng, HsinChu (TW); Ming-Dao Chen, HsinChu (TW); Jang-Ming Li, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 121 days.

(21) Appl. No.: 18/603,197

(22) Filed: Mar. 12, 2024

(65) Prior Publication Data
US 2024/0364706 A1 Oct. 31, 2024

(30) Foreign Application Priority Data
Apr. 27, 2023 (TW) .................................. 112115703

(51) Int. Cl.
*H04L 9/40* (2022.01)
*H04L 67/104* (2022.01)

(52) U.S. Cl.
CPC .......... *H04L 63/108* (2013.01); *H04L 63/101* (2013.01); *H04L 67/1044* (2013.01)

(58) Field of Classification Search
CPC .. H04L 63/108; H04L 63/101; H04L 67/1044
USPC .......................................................... 726/4
See application file for complete search history.

(56) References Cited

U.S. PATENT DOCUMENTS

| | | | |
|---|---|---|---|
| 9,374,707 B2 * | 6/2016 | Kruglick | H04L 9/3273 |
| 10,785,229 B2 * | 9/2020 | Bolton | H04L 63/0876 |
| 11,388,594 B2 * | 7/2022 | Uy | H04L 9/0844 |
| 11,539,513 B1 * | 12/2022 | Hussain | H04L 65/1069 |
| 11,570,179 B2 * | 1/2023 | Gordon | H04L 9/083 |
| 2019/0199728 A1 * | 6/2019 | Lundberg | G07C 9/00857 |
| 2019/0386824 A1 * | 12/2019 | Havaralu Rama Chandra Adiga | H04L 63/061 |

(Continued)

FOREIGN PATENT DOCUMENTS

WO WO-2019143591 A1 * 7/2019 ............. H04L 67/12

OTHER PUBLICATIONS 802.1X-2020—IEEE Standard for Local and Metropolitan Area Networks—Port-Based Network Access Control, Feb. 28, 2020, IEEE.

*Primary Examiner* — Tauqir Hussain
(74) *Attorney, Agent, or Firm* — Winston Hsu

(57) ABSTRACT

A communication device includes a transceiver and a control circuit. The control circuit determines whether to transmit a second MKPDU in advance according to a member identifier of a peer device carried by a received first MKPDU and one or more lists maintained by the communication device. When the member identifier of the peer device is not recorded in the one or more lists, the control circuit determines to transmit the second MKPDU in advance. When the control circuit determines to transmit the second MKPDU in advance, the control circuit generates the second MKPDU, encodes the second MKPDU to generate a frame, and transmits a signal carrying the frame through the transceiver, wherein a time interval between the transmission of the signal and a previous transmission performed by the transceiver is less than a predetermined transmission period.

20 Claims, 7 Drawing Sheets

(56) References Cited

U.S. PATENT DOCUMENTS

| | | | |
|---|---|---|---|
| 2022/0103551 A1* | 3/2022 | Talwar | H04L 65/1069 |
| 2022/0232009 A1* | 7/2022 | Gordon | H04L 63/08 |
| 2024/0121087 A1* | 4/2024 | Basu | H04L 9/088 |

* cited by examiner

COMMUNICATION DEVICE AND METHOD FOR ACCELERATING DEVICE DISCOVERY AND IDENTIFICATION

BACKGROUND OF THE INVENTION

1. Field of the Invention

The present invention is related to a method for accelerating device discovery and identification in a communication environment, and more particularly, to a method that is applicable to a discovery stage in a flow for establishing a media access control security (MACsec) channel.

2. Description of the Prior Art

IEEE 802.1X is a certification standard for user access to the network developed by the Institute of Electrical and Electronics Engineers (IEEE), and is a part of the IEEE 802.1 network protocol group.

IEEE 802.1AE (also known as the MACsec) is a network security standard that operates at a media access control (MAC) layer, and defines the integrity and optional confidentiality of connection data for a media access independent protocol.

In order to fully support the concept of Connectivity Association (CA), which is defined in IEEE 802.1AE, along with the session keys management, IEEE 802.1X introduced the MACsec Key Agreement Protocol (MKA) for respective MACsec handshake operations among peers that are tend to join the same security group on local area access network segments.

Security operations are performed between devices in a group, such as a CA. As a result, devices in the network environment must first discover each other and exchange identification information before establishing the CA and further establishing the MACsec channel. The operations of discovery and information exchange are included in a discovery stage in a flow for establishing the MACsec channel.

Due to its security and compatibilities, the MACsec standard is designed for many different types of communication environments. The behavior defined by the MACsec standard, however, may cause significant delays in some scenarios. For products with low delay requirements, such delays are not acceptable.

SUMMARY OF THE INVENTION

It is therefore one of the objectives of the present invention to provide a method for accelerating device discovery and identification, to address the above-mentioned significant delay problems in the flow for establishing the MACsec channel.

According to an embodiment of the present invention, a communication device is provided. The communication device comprises a transceiver and a control circuit. The transceiver is arranged to receive a first signal, wherein the first signal comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device. The control circuit is arranged to maintain one or more lists, and determine whether to transmit a second MKPDU in advance according to the first member identifier and the one or more lists. When the control circuit determines the first member identifier is not recorded in the one or more lists, the control circuit adds the first member identifier to the one or more lists, and determines to transmit the second MKPDU in advance. When the control circuit determines to transmit the second MKPDU in advance, according to the first member identifier and a second member identifier of the communication device, the control circuit sets a plurality of second MKA parameters carried by the second MKPDU, generates the second MKPDU, encodes the second MKPDU to generate a second frame, and transmits a second signal carrying the second frame through the transceiver, wherein a time interval between a transmission of the second signal and a previous transmission performed by the transceiver is less than a predetermined transmission period.

According to another embodiment of the present invention, a method for accelerating device discovery and identification is provided. The method comprises: receiving a first signal by a communication device, wherein the first signal comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device; determining whether the first member identifier is not recorded in one or more lists maintained by the communication device; and in response to the first member identifier not being recorded in the one or more lists, adding the first member identifier to the one or more lists, and determining to transmit a second MKPDU in advance. In response to the second MKPDU being determined to be transmitted in advance, the method further comprises: setting a plurality of second MKA parameters carried by the second MKPDU according to a second member identifier of the communication device and the first member identifier; generating the second MKPDU; encoding the second MKPDU to generate a second frame; and transmitting a second signal carrying the second frame, wherein a time interval between a transmission of the second signal and a previous transmission performed by the communication device is less than a predetermined transmission period.

According to another embodiment of the present invention, a method for accelerating device discovery and identification is provided. The method comprises: setting a timer to count a predetermined transmission period; receiving one or more first signals by a communication device, wherein each of the one or more first signals comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device; updating one or more lists maintained by the communication device according to contents of the one or more first signals; calculating a number of peer devices recorded in the one or more lists, and determining whether the number of peer devices reaches a predetermined value; and in response to the number of peer devices reaching the predetermined value, determining to transmit a second MKPDU in advance. In response to the second MKPDU being determined to be transmitted in advance, the method further comprises: setting a plurality of second MKA parameters carried by the second MKPDU according to a second member identifier of the communication device and updated contents of the one or more lists; generating the second MKPDU; encoding the second MKPDU to generate a second frame; and transmitting a second signal carrying the second frame before a timer count expires, wherein a time interval between a transmission of the second signal and a previous transmission performed by the communication device is less than the predetermined transmission period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
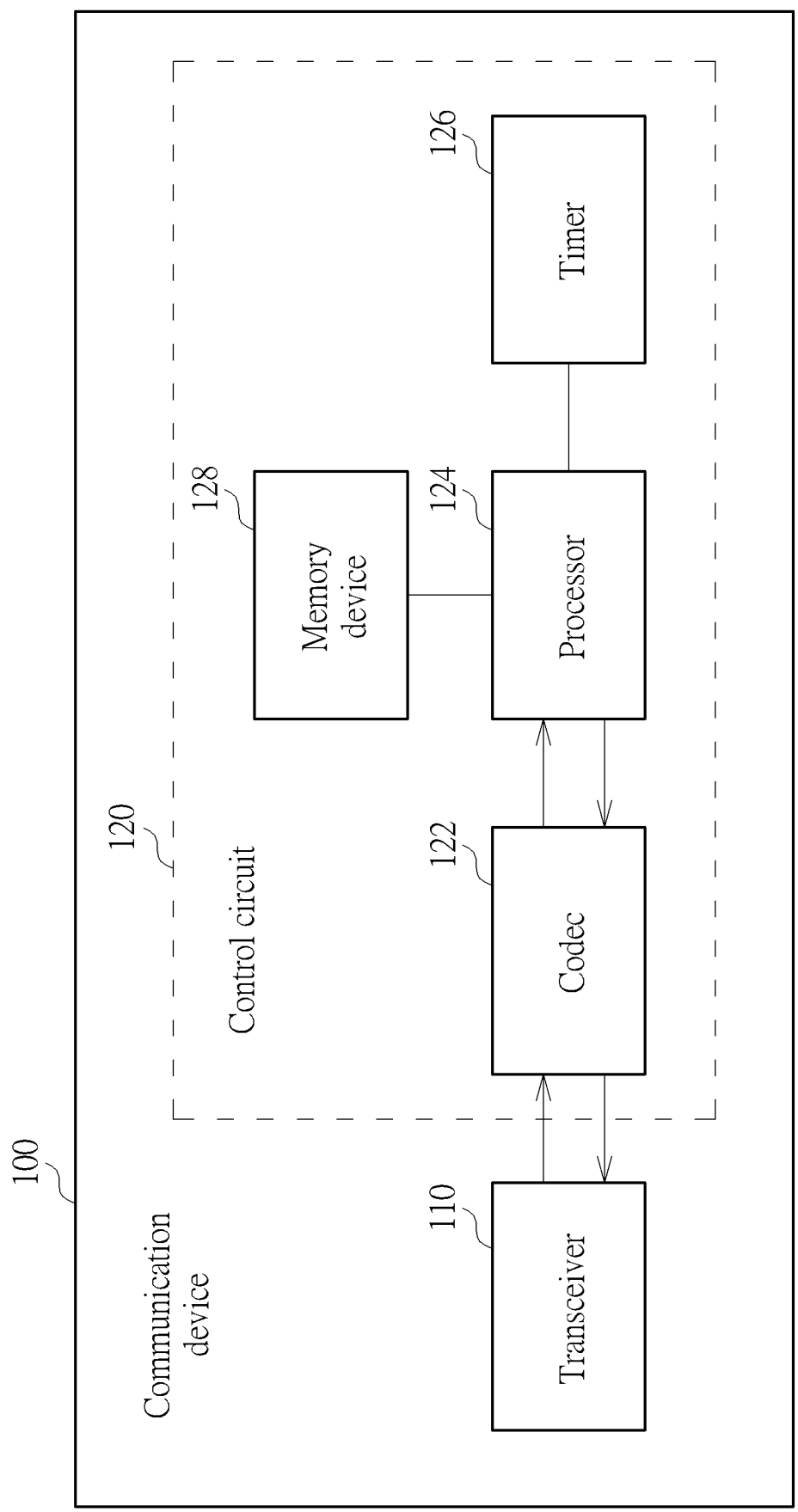
FIG. 1 is a block diagram of a communication device according to an embodiment of the present invention.

FIG. 1 is a block diagram of a communication device 100 according to an embodiment of the present invention, wherein the communication device 100 includes at least one transceiver (e.g. a transceiver 110) and a control circuit 120. The control circuit 120 includes a codec (coder/decoder) 122, a processor 124, a timer 126, and a memory device 128. The transceiver 110 is arranged to transmit and receive signals. The codec 122 is arranged to decode received signals and encode transmitted signals. The timer 126 includes one or more timers. In response to setting and control of the processor 124, the timer 126 performs a corresponding timing (or counting) operation. For example, the timing effect is achieved by counting a number of pulses or periods of a clock signal. The processor 124 is arranged to control operations of the communication device 100. For example, the processor 124 executes program code stored in the memory device 128 to perform a corresponding control. The memory device 128 further stores data required and/or generated in the operations of the communication device 100.

It should be noted that FIG. 1 is a simplified communication device and only illustrates components related to the present invention. In practice, a communication device may further include components that are not shown in FIG. 1 and can implement communication and associated signal processing.

In a flow for establishing a media access control security (MACsec) channel, the transceiver 110 keeps receiving signals, wherein each received signal may include a frame, the frame may include a MACsec key agreement protocol data unit (media access control security key agreement protocol data unit, MKPDU) generated by a peer device, and the MKPDU may carry a plurality of MACsec key agreement protocol (media access control security key agreement protocol, MKA) parameters set by the peer device.

The control circuit 120 (e.g. the processor 124) may maintain one or more lists, wherein each of the one or more lists is arranged to record states of detected peer devices in a communication environment. The processor 124 may update contents of the one or more lists according to contents of the received signals (e.g. contents of the received MKPDUs).

Figure 2A:
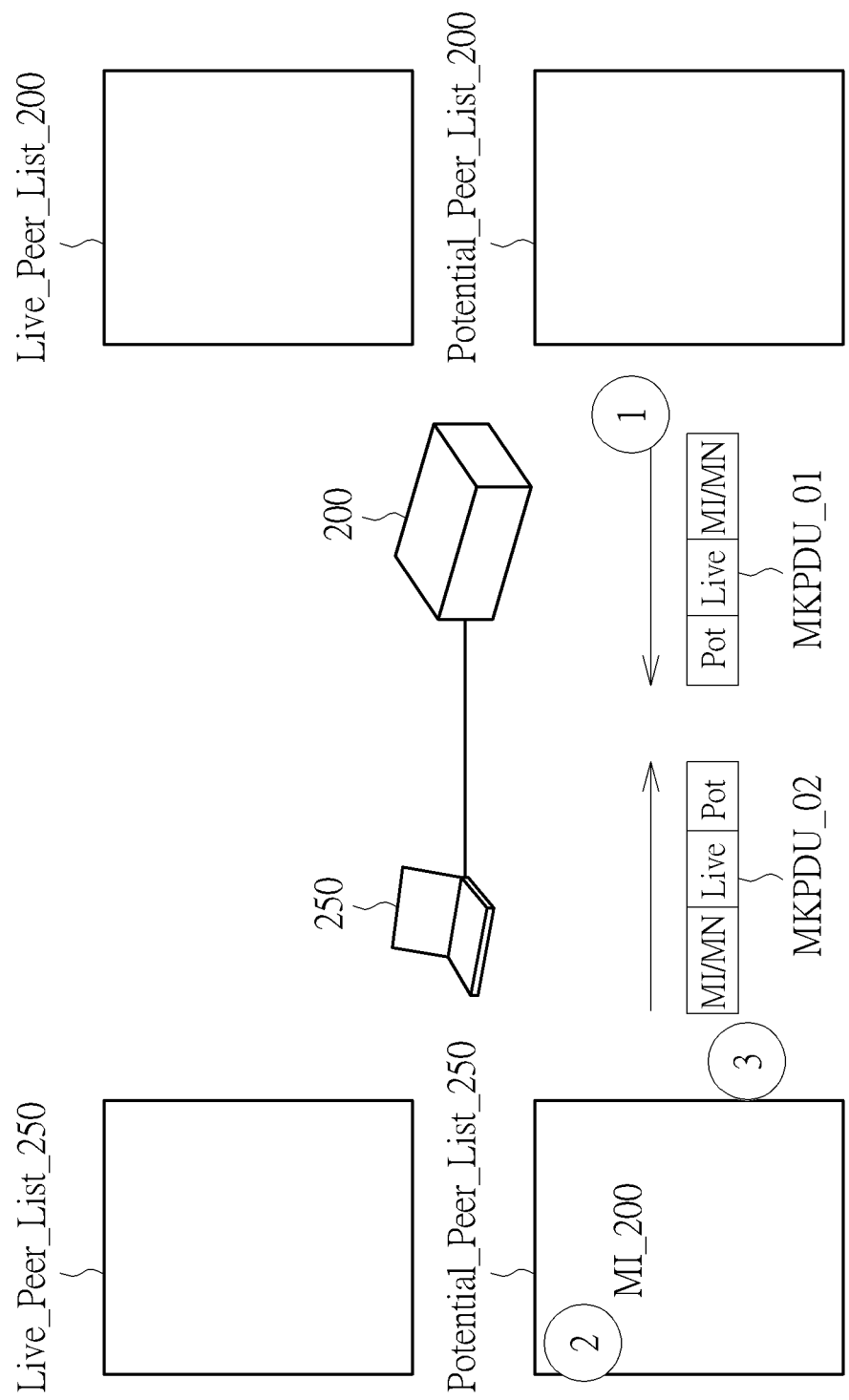
FIG. 2A is a diagram illustrating a discovery stage in a flow for establishing a MACsec channel according to an embodiment of the present invention.
Figure 2B:
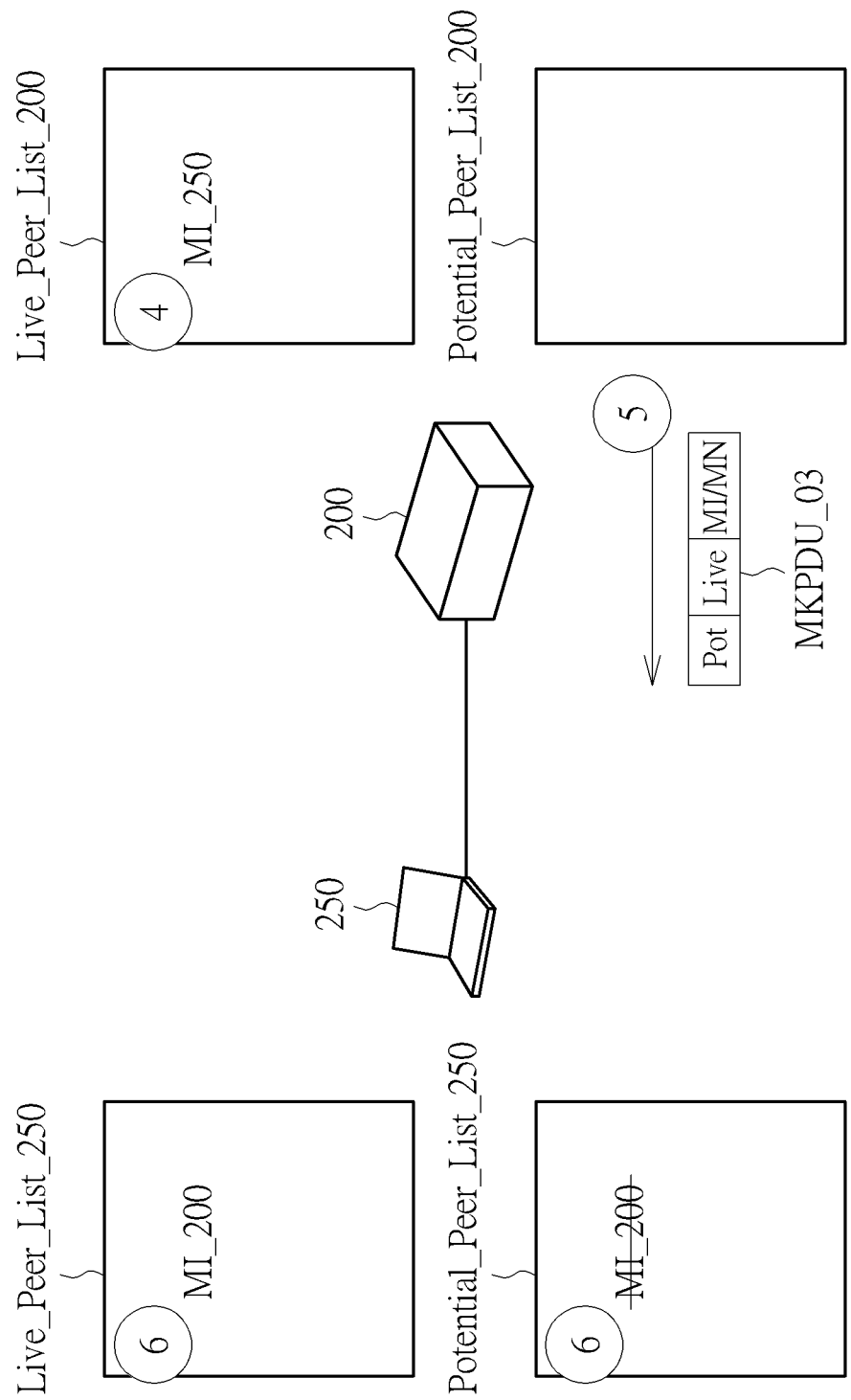
FIG. 2B is a diagram illustrating a discovery stage in a flow for establishing a MACsec channel according to an embodiment of the present invention.

FIG. 2A and FIG. 2B are diagrams illustrating a discovery stage in a flow for establishing a MACsec channel according to an embodiment of the present invention. In this embodiment, two devices in the communication environment are used as an illustration, but it should be noted that a Connectivity Association (CA) in the communication environment may include more than two devices. Since devices in the communication environment may perform device discovery and identification in the same or similar manner during the discovery stage, those skilled in the art can deduce cases of more than two devices based on contents shown in FIG. 2A and FIG. 2B; descriptions for operations of the cases of more than two devices are therefore omitted here for brevity.

Assume that communication devices 200 and 250 exist in the communication environment, wherein each of the communication devices 200 and 250 can be implemented by the communication device 100 shown in FIG. 1. For the communication device 200, the communication device 250 (or each of other devices existing in the communication environment) is a peer device. Similarly, for the communication device 250, the communication device 200 (or each of other devices existing in the communication environment) is a peer device.

Each of the devices in the communication environment may maintain a live peer list Live_Peer_List and a potential peer list Potential_Peer_List at a host side (e.g. by using the memory device 128), recording states of detected peer devices in the communication environment. For example, the potential peer list Potential_Peer_List is arranged to record discovered devices, and the live peer list Live_Peer_List is arranged to record devices with which the MACsec channel can be established. Since each device may maintain its own lists, FIG. 2A and FIG. 2B indicate which device maintains each list through adding a component symbol of a corresponding device. For example, a live peer list Live_Peer_List_200 and a potential peer list Potential_Peer_List_200 are lists maintained by the communication device 200, and a live peer list Live_Peer_List_250 and a potential peer list Potential_Peer_List_250 are lists maintained by the communication device 250. It should be noted that the same annotation applies to other MKA parameters, such as a member identifier (MI).

Before peer devices in the communication environment are discovered, information of the peer devices may not be recorded in the lists maintained by the communication devices 200 and 250. For example, both the live peer list Live_Peer_List_200 and the potential peer list Potential_Peer_List_200 shown in FIG. 2A do not record information of the communication device 250. In FIG. 2A, an empty list state is used to indicate a state in which the information of the peer device is not recorded in the corresponding list. In practice, the live peer list Live_Peer_List_200 and the potential peer list Potential_Peer_List_200 in FIG. 2A are not necessarily empty lists. The live peer list Live_Peer_List_200 and the potential peer list Potential_Peer_List_200 may have recorded information of other peer devices, but do not yet include the information of the communication device 250.

In an operation 1, the communication device 200 may transmit signals including an MKDPU MKPDU_01 by multicasting. For example, a processor of the communication 200 (e.g. the processor 124) may set a plurality of MKA parameters required to be carried by the MKDPU MKPDU_01, and generate the MKDPU MKPDU_01 carrying the MKA parameters. A codec of the communication 200 (e.g. the codec 122) may encode the MKDPU MKPDU_01 to generate a corresponding frame. A transceiver of the communication device 200 (e.g. the transceiver 110) may transmit a signal carrying the frame.

The MKA parameters may include an MI of a device transmitting the MKPDU (e.g. an MI MI_200 of the communication device 200) for identification. In addition, the MKA parameters may further include a message number (MN) corresponding to this transmission, a live peer list Live maintained by the communication device 200 (e.g. the live peer list Live_Peer_List_200), and a potential peer list Pot maintained by the communication device 200 (e.g. the potential peer list Potential_Peer_List_200).

In an operation 2, the communication device 250 receives the signal carrying the frame, and a codec of the communication device 250 (e.g. the codec 122) may decode the frame to obtain the MKPDU MKPDU_01 transmitted by the communication device 200. A processor of the communication device 250 (e.g. the processor 124) may check contents of the MKPDU MKPDU_01. For example, the processor of the communication device 250 may determine whether the information of the communication device 250 is recorded in the lists maintained by the communication device 200, and determine whether the information of the communication device 200 (e.g. the MI MI_200 of the communication device 200) is recorded in the lists maintained by the communication device 250. If it is determined that the information of the communication device 200 is not recorded in the live peer list Live_Peer_List_250 and the potential peer list Potential_Peer_List_250 maintained by the communication device 250, the communication device 250 may record the information of the communication device 200 in the potential peer list Potential_Peer_List_250. For example, the communication device 250 may record the MI MI_200 of the communication device 200 in the potential peer list Potential_Peer_List_250.

In an operation 3, the communication device 250 may transmit a signal including an MKDPU MKPDU_02 by multicasting. For example, a processor of the communication 250 (e.g. the processor 124) may set a plurality of MKA parameters required to be carried by the MKDPU MKPDU_02, and generate the MKDPU MKPDU_02 carrying the MKA parameters. A codec of the communication 250 (e.g. the codec 122) may encode the MKDPU MKPDU_02 to generate a corresponding frame. A transceiver of the communication device 250 (e.g. the transceiver 110) may transmit a signal carrying the frame. The MKA parameters carried by the MKDPU MKPDU_02 may include an MI MI_250 of the communication device 250 for identification, an MN corresponding to this transmission, a live peer list Live maintained by the communication device 250 (e.g. the live peer list Live_Peer_List_250), and a potential peer list Pot maintained by the communication device 250 (e.g. the potential peer list Potential_Peer_List_250).

In an operation 4, the communication device 200 receives the signal carrying the frame, and a codec of the communication device 200 (e.g. the codec 122) may decode the frame to obtain the MKPDU MKPDU_02 transmitted by the communication device 250. A processor of the communication device 200 (e.g. the processor 124) may check contents of the MKPDU MKPDU_02. For example, the processor of the communication device 200 may determine whether the information of the communication device 200 is recorded in the lists maintained by the communication device 250, and determine whether the information of the communication device 250 is recorded in the lists maintained by the communication device 200. Since the communication device 200 determines that the information of the communication device 200 is recorded in the potential peer list Potential_Peer_List_250 maintained by the communication device 250, the communication device 200 may record the information of the communication device 250 in the live peer list Live_Peer_List_200. For example, the communication device 200 may record the MI MI_250 of the communication device 250 in the live peer list Live_Peer_List_200.

In an operation 5, the communication device 200 may transmit a signal including an MKDPU MKPDU_03 by multicasting. Similarly, the processor of the communication device 200 may set a plurality of MKA parameters required to be carried by the MKDPU MKPDU_03, and generate the MKDPU MKPDU_03 carrying the MKA parameters. The codec of the communication 200 may encode the MKDPU MKPDU_03 to generate a corresponding frame. The transceiver of the communication device 200 may transmit a signal carrying the frame. As mentioned above, the MKA parameters carried by the MKDPU MKPDU_03 may include the MI MI_200 of the communication device 200 for identification, an MN corresponding to this transmission, a live peer list Live maintained by the communication device 200 (e.g. the live peer list Live_Peer_List_200), and a potential peer list Pot maintained by the communication device 200 (e.g. the potential peer list Potential_Peer_List_200).

In an operation 6, the communication device 250 receives the signal carrying the frame, and the codec of the communication device 250 (e.g. the codec 122) may decode the frame to obtain the MKPDU MKPDU_03 transmitted by the communication device 200. Since the communication device 250 finds that its own information is recorded in the live peer list Live_Peer_List_200 maintained by the communication device 200, the communication device 250 can record the information of the communication device 200 in the live peer list Live_Peer_List_250 maintained by the communication device 250, and delete the information of the communication device 200 from the potential peer list Potential_Peer_List_250. That is, the state of the communication device 200 is updated from the potential peer list to the live peer list.

Since the information of the communication device 200 and the information of the communication device 250 have been recorded in the other's live peer list, operations of the discovery stage (also called a prove-liveness stage) between the communication devices 200 and 250 are completed.

It should be noted that the MACsec standard defines a predetermined transmission period for periodically transmitting the MKPDU, such as a hello time defined in the MKA. As specified in the MKA, the length of the hello time is 2 seconds. Therefore, under a condition that a communication device operates according to the MKA, every time the communication device completes the transmission of an MKPDU, it must count for 2 seconds and transmit the next MKPDU once the count of 2 seconds expires.

Assume that an existing device within the communication environment immediately receives an MKPDU transmitted by a new device (e.g. a device that has just been powered on) after transmitting an MKPDU. Due to the limitation of the predetermined transmission period (i.e. the hello time), the existing device cannot immediately transmit an MKPDU response to the new device, which causes an additional delay (e.g. a delay close to or equal to the predetermined transmission period or the hello time, such as a delay close to or equal to the above-mentioned 2 seconds). When the MACsec standard is applied to an automotive communication environment, since the automotive communication environment needs to establish the MACsec channel in a very short time (e.g. immediately after starting the engine), such delay is not allowed.

To address this issue, the present invention provides a novel method for effectively accelerating device discovery and identification in the communication environment, so that the MACsec standard can be applicable to different types of communication environments without causing any unacceptable delay.

Figure 3:
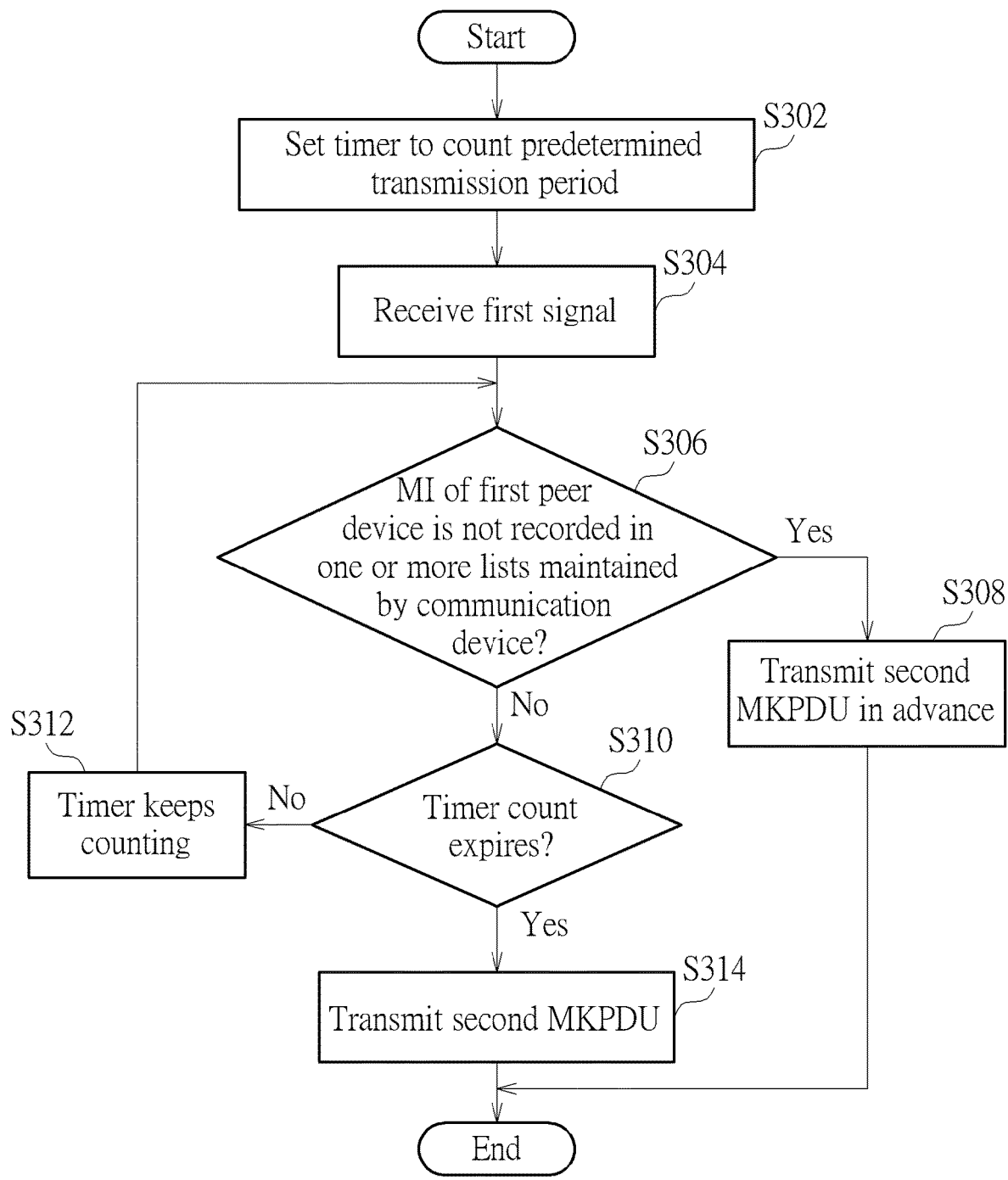
FIG. 3 is a flow chart of a method for accelerating device discovery and identification in a communication environment according to an embodiment of the present invention.

FIG. 3 is a flow chart of a method for accelerating device discovery and identification in a communication environment according to an embodiment of the present invention. The method includes the following steps performed by a communication device within the communication environment (e.g. the communication device 100).

In Step S302, after completing a previous transmission (e.g. a transmission of an MKPDU), the communication device 100 sets a timer to count a predetermined transmission period. As mentioned above, in order to operate according to the MKA, after the previous transmission is completed, the timer will be set to count the predetermined transmission period, wherein the predetermined transmission period may be (but is not limited to) the hello time defined in the MKA. For example, the processor may calculate how many cycles or pulses of a clock signal need to be counted according to a length of the predetermined transmission period and a frequency of the clock signal. That is, the predetermined transmission period is converted into a count value, and the timer is arranged to count down from the count value in response to the pulses of the clock signal.

In Step S304, a first signal is received. As mentioned above, the first signal may include a first frame, wherein the first frame may include a first MKPDU generated by a first peer device, the first MKPDU carries a plurality of MKA parameters set by the first peer device, and the MKA parameters include an MI of the first peer device.

In Step S306, it is determined whether the MI of the first peer device is not recorded in one or more lists maintained by the communication device 100. For example, it is determined whether the MI of the first peer device is not recorded in the live peer list Live_Peer_List and the potential peer list Potential_Peer_List maintained by the host side. If Yes, it is determined to transmit a second MKPDU in advance, and Step S308 is entered. It should be noted that before Step S308 is entered, the communication device 100 adds the MI of the first peer device to the potential peer list Potential_Peer_List maintained by the host side. If No, Step S310 is entered.

In Step S308, the second MKPDU is transmitted in advance (e.g. through a second signal).

In Step S310, it is determined whether a timer count for counting the predetermined transmission period expires (e.g. when the timer counts to 0, it means that the count expires). If Yes, Step S314 is entered. If No, Step S312 is entered.

In Step S312, transmission of any MKPDU is temporarily stopped, and the predetermined transmission period is continuously counted (e.g. the timer keeps counting or counting down). It should be noted that, since the communication device 100 may still receive MKPDUS transmitted by other peer devices while waiting for the count to expire, the flow may return to Step S304 when a new MKPDU is received.

In Step S314, the second MKPDU is transmitted (e.g. through the second signal).

It should be noted that a difference between Step S308 and Step S314 is a time point of transmission. That is, in Step S308, since it is not required to wait for the timer count corresponding to the predetermined transmission period to expire, the second MKPDU is transmitted in advance. In Step S314, the method waits for the count to expire. As a result, a time interval between the transmission of the second signal and a previous transmission performed by the communication device in Step S308 is less than the predetermined transmission period.

The steps of transmitting the second MKPDU (e.g. Steps S308 and S314) may further include following operations:
setting a plurality of MKA parameters of the second MKPDU according to the MI of the communication device 100 and the MI of the first peer device, wherein the MKA parameters may include the MI of the communication device 100, the MN corresponding to this transmission, the live peer list Live_Peer_List maintained by the communication device 100, and the potential peer list Potential_Peer_List maintained by the communication device 100, and the MI of the first peer device can be recorded in the live peer list Live_Peer_List or the potential peer list Potential_Peer_List at this moment;
generating the second MKPDU carrying the MKA parameters;
encoding the second MKPDU to generate the second frame; and
transmitting the second signal carrying the second frame.

When a control circuit of the communication device (e.g. the processor 124 within the control circuit 120) determines the MI of the first peer device is not recorded in the live peer list Live_Peer_List maintained by the control circuit and the potential peer list Potential_Peer_List maintained by the control circuit, the control circuit (or the processor 124) may add the MI of the first peer device to the potential peer list Potential_Peer_List maintained by the communication device (e.g. the operation 2 shown in FIG. 2A) or the live peer list Live_Peer_List maintained by the communication device (e.g. the operation 4 shown in FIG. 2B), and directly determine to transmit the second MKPDU in advance.

In a first embodiment of the present invention, when it is determined to transmit the second MKPDU in advance, the control circuit (or the processor 124) immediately sets the MKA parameters of the second MKPDU and immediately generates the second MKPDU and the second frame without considering the predetermined transmission period, and the transceiver 110 immediately transmits the second signal carrying the second frame after obtaining the second frame.

Figure 4:
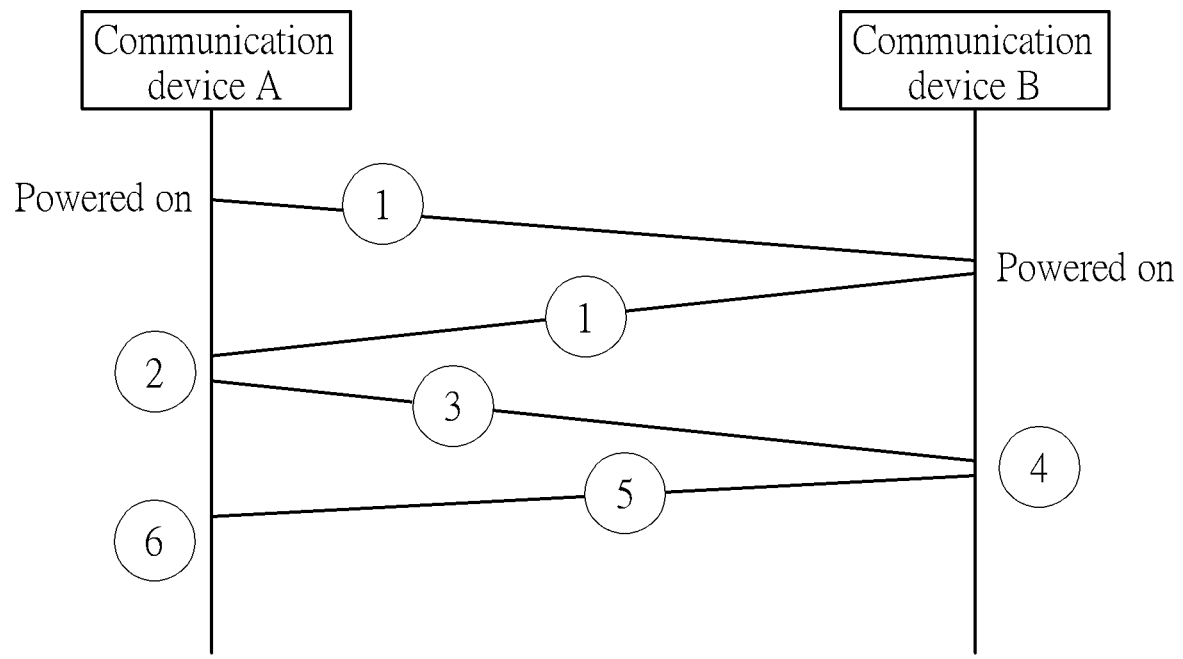
FIG. 4 is a timing diagram obtained by the method shown in FIG. 3 according to a first embodiment of the present invention.

FIG. 4 is a timing diagram obtained by the method shown in FIG. 3 according to a first embodiment of the present invention. In the first embodiment, both communication devices A and B perform the operation 1 after being powered on, and transmit a frame including an MKPDU by multicasting, wherein operations of the communication devices A and B for generating the MKPDU can be known by referring to the embodiment shown in FIG. 2A, similar descriptions are not repeated here.

After a device is powered on, since there is no information about other devices, the device first transmits an MKPDU to identify itself. In the first embodiment, when the communication device A receives an MKPDU from the communication device B (operation 2), and determines an MI of the communication device B is not recorded in the live peer list Live_Peer_List and the potential peer list Potential_Peer_List maintained by the communication device A, the communication device A can directly perform the operation 3. That is, the communication device A may transmit the frame including the MKPDU again by multicasting to identify itself. The MKPDU transmitted by the operation 3 is different from the MKPDU transmitted by the operation 1. For example, in the MKPDU transmitted by the operation 3, the MI of the communication device B is recorded in the potential peer list Potential_Peer_List maintained by the communication device A. The communication device A performs a handshake with the communication device B by recording the MI of the communication device B in the potential peer list Potential_Peer_List maintained by the communication device A. Since contents of the operations 2 and 3 can be known by referring to the relevant descriptions in FIG. 2A, similar descriptions are not repeated here.

Afterwards, the communication devices A and B may perform the operations 4, 5, and 6 in sequence. Similarly, when the communication device B receives an MKPDU from the communication device A (operation 4), and determines an MI of the communication device A is not recorded in the live peer list Live_Peer_List and the potential peer list Potential_Peer_List maintained by the communication device B, the communication device B may directly perform the operation 4. Since contents of the operations 4, 5, and 6 can be known by referring to the relevant descriptions in FIG. 2B, similar descriptions are not repeated here.

According to the MKA, after the communication device A performs the operation 1, a timer is set to count the predetermined transmission period. In the existing art, since the communication device A completely complies with the MKA, the communication device A must wait until the timer count expires before performing the operation 3. As a result, even if the communication device A has obtained the information of the communication device B, it still needs to wait for a period of time equal to the predetermined time period, thus causing an unnecessary delay. Similarly, in the existing art, the communication device B must wait until the timer count expires before performing the operation 5.

In embodiments of the present invention, after the communication device A determines the MI of the communication device B is not recorded in the live peer list Live_Peer_List and the potential peer list Potential_Peer_List maintained by the communication device A, the communication device A may directly perform the operation 3 (the timing shown in FIG. 4 shows that there is no delay that is as long as the preset transmission period between the operations 2 and 3). Similarly, the communication device B may directly perform the operation 5 (the timing shown in FIG. 4 shows that there is no delay that is as long as the preset transmission period between the operations 4 and 5). As a result, compared with the existing art, the communication device A performs the operation 3 in advance and/or the communication device B performs the operation 5 in advance, which greatly accelerates the device discovery and identification. More particularly, in the first embodiment of the present invention, between the operations 2 and 3 and between the operations 4 and 5, there may only be the signal processing time necessary for the corresponding signal processing device without any additional delay.

According to a second embodiment of the present invention, in order to be closer to behaviors specified by the MKA, the control circuit (or the processor 124) may set another timer to count a waiting time after the previous transmission is completed, wherein the waiting time is shorter than the predetermined transmission period. When the control circuit (or the processor 124) determines to transmit the second MKPDU in advance, the second signal carrying the second frame is directly transmitted when a timer count for counting the waiting time expires.

Figure 5:
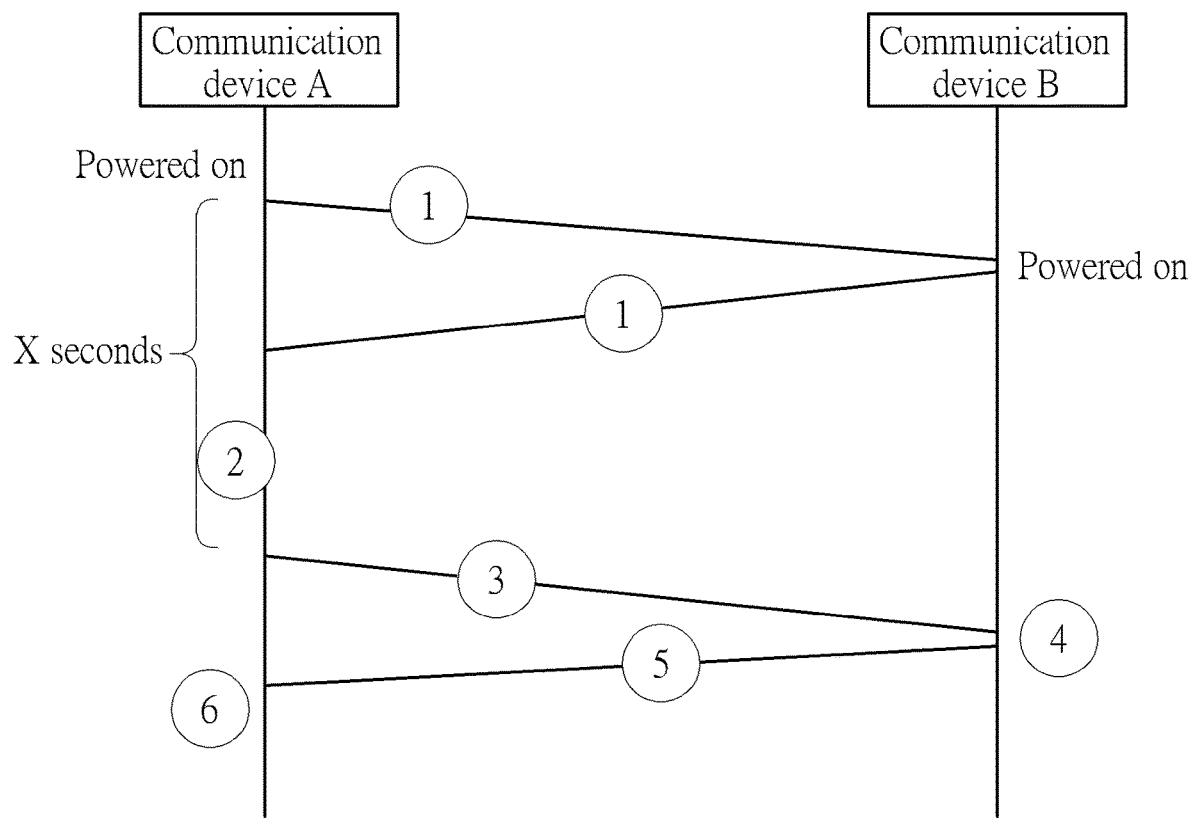
FIG. 5 is a timing diagram obtained by the method shown in FIG. 3 according to a second embodiment of the present invention.

FIG. 5 is a timing diagram obtained by the method shown in FIG. 3 according to a second embodiment of the present invention. In this embodiment, assume that the waiting time is set as X seconds, and the waiting time is shorter than the predetermined transmission period. After the communication devices A and B perform the operation 1, a timer can be set to count the waiting time with X seconds.

Since a starting time of the communication device A is earlier than that of the communication device B, the communication device A may receive an MKPDU from the communication device B (operation 2). When the communication device A determines an MI of the communication device B is not recorded in the live peer list Live_Peer_List and the potential peer list Potential_Peer_List maintained by the communication device A, the communication device A may perform the operation 3 when the timer count expires, to directly transmit the frame including the MKPDU again by multicasting. Afterwards, the communication devices A and B may perform the operations 4, 5, and 6 in sequence. Similarly, the communication device B may perform the operation 5 when the timer count expires.

Similarly, the MKPDU transmitted by the operation 3 is different from the MKPDU transmitted by the operation 1. For example, in the MKPDU transmitted by the operation 3, the MI of the communication device B is recorded in the potential peer list Potential_Peer_List maintained by the communication device A. The communication device A performs a handshake with the communication device B by recording the MI of the communication device B in the potential peer list Potential_Peer_List maintained by the communication device A. Since contents of the operations 1-6 can be known by referring to the relevant descriptions in FIG. 2A and FIG. 2B, similar descriptions are not repeated here.

In the second embodiment of the present invention, after the MI of the communication device B is determined to not be recorded in the live peer list Live_Peer_List and the potential peer list Potential_Peer_List maintained by the communication device A, the communication device A may perform the operation 3 in response to the waiting time that is shorter than the predetermined transmission period expiring. Similarly, the communication device B may perform the operation 5 in response to the waiting time that is shorter than the predetermined transmission period expiring. As a result, compared with the existing art, the communication device A performs the operation 3 in advance and the communication device B performs the operation 5 in advance, which accelerates the device discovery and identification.

According to a third embodiment of the present invention, in order to further increase the transmission efficiency, before it is determined to transmit the second MKPDU (e.g. the MKPDU transmitted by performing the operation 3) in advance, the control circuit (or the processor 124) may further calculate a number of peer devices currently recorded in the one or more lists maintained by the control circuit. Only after the number of peer devices reaches a predetermined value will the control circuit determine to transmit the second MKPDU in advance. In this embodiment, the predetermined value may be set as a number of members participating in the same CA. In some embodiments, the predetermined value may be set as a value similar to (e.g. slightly lower than) the number of members participating in the same CA. The number of members participating in the same CA may be defined as a configuration of the MACsec channel in advance, and may be stored in a memory of each communication device (e.g. the memory device 128). In response to the communication device receiving MKPDUs from other peer devices and a number of MKPDUS reaching the predetermined value, the communication device may immediately establish the CA. In other words, after the communication device receives a predetermined number of MKPDUs, the communication device may establish the CA only through an MKPDU including multiple MIs of the CA, which can minimize the time and the traffic bandwidth consumed by the device discovery and identification.

In this embodiment, since the communication device may update contents of the one or more lists according to received MKPDUs, the communication device may determine whether a predetermined number of MKPDUs from different peer devices (or a predetermined number of information of the peer devices) have been received by determining whether a number of peer devices recorded in the one or more lists maintained by the communication device reaches the predetermined value.

Figure 6:
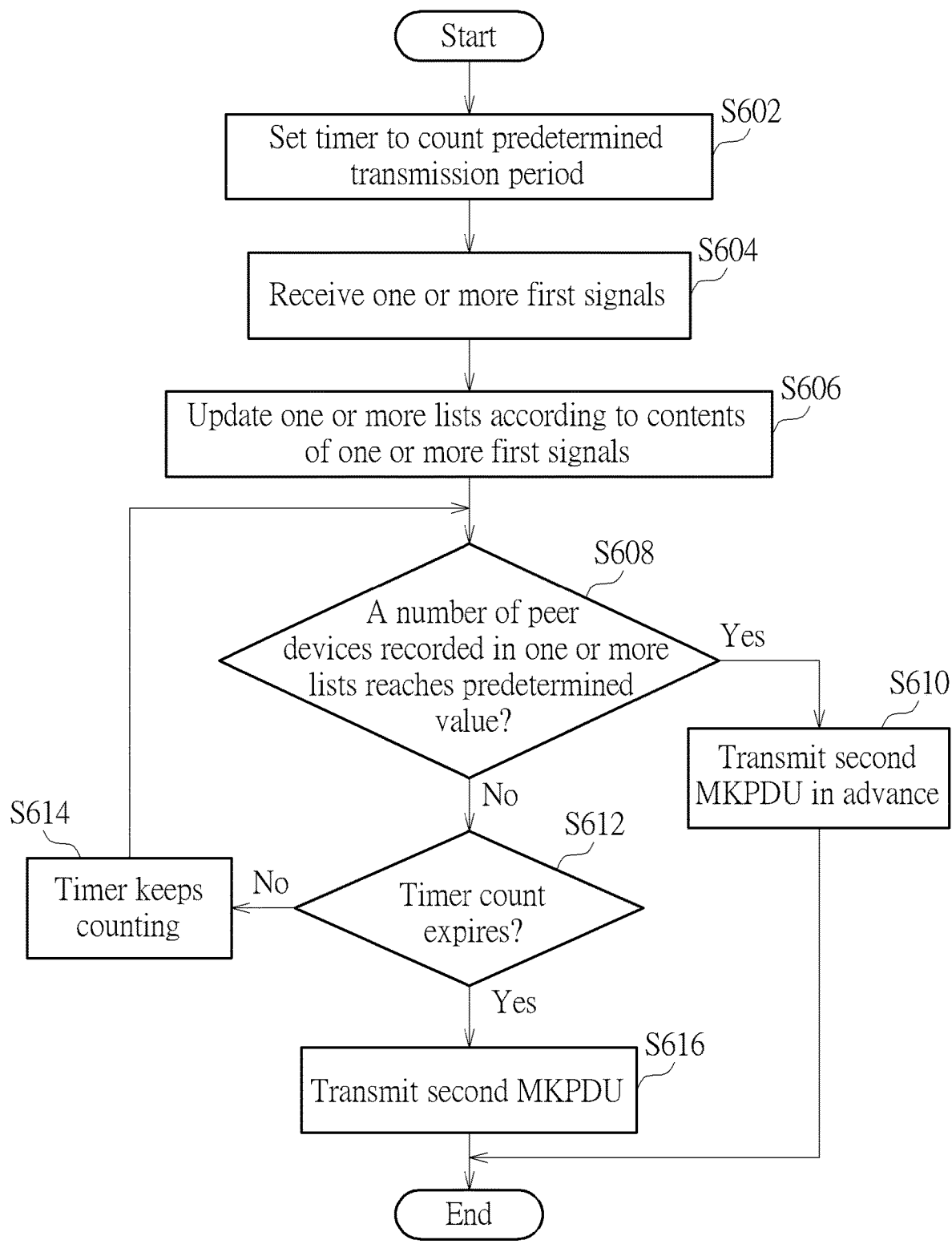
FIG. 6 is a flow chart of a method for accelerating device discovery and identification in a communication environment according to another embodiment of the present invention.

FIG. 6 is a flow chart of a method for accelerating device discovery and identification in a communication environment according to another embodiment of the present invention. The method includes the following steps performed by a communication device within the communication environment (e.g. the communication device 100).

In Step S602, after a previous transmission (e.g. a transmission of an MKPDU) is completed, the communication device 100 sets a timer to count a predetermined transmission period.

In Step S604, one or more first signals are received, wherein each of the one or more first signals includes a first frame, the first frame includes a first MKPDU generated by a peer device, the first MKPDU carries a plurality of MKA parameters set by the peer device, and the plurality of MKA parameters includes an MI of the peer device.

In Step S606, one or more lists maintained by the communication device 100 are updated according to contents of the one or more first signals (e.g. one or more first MKPDUs). For example, for a peer device that is not recorded in the live peer list Live_Peer_List and the potential peer list Potential_Peer_List maintained by the communication device 100, the MI of the peer device is added to the potential peer list Potential_Peer_List. For a peer device that is recorded in the potential peer list Potential_Peer_List or a peer device with an MI recorded in the potential peer list Potential_Peer_List, the MI of the peer device is updated to the live peer list Live_Peer_List.

In Step S608, it is determined whether a number of peer devices recorded in the one or more lists reaches a predetermined value. For example, the communication device 100 may calculate a number of peer devices recorded in the live peer list maintained by the communication device 100 (e.g. a first number of peer devices), calculate a number of peer devices recorded in the potential peer list maintained by the communication device 100 (e.g. a second number of peer devices), and calculate a sum of the first number of peer devices and the second number of peer devices to obtain a number of peer devices recorded in the one or more lists. If the predetermined value is reached, Step S610 is entered; if not, Step S612 is entered.

In Step S610, a second MKPDU is transmitted in advance (e.g. through a second signal). When the communication device 100 receives a predetermined number of MKPDUs, the second MKPDU may be transmitted in advance, and a CA may be established only through transmitting an MKPDU including multiple (e.g. all) MI information of the CA, which can further increase the transmission efficiency.

In Step S612, it is determined whether a timer count corresponding to the predetermined transmission period expires, wherein the predetermined transmission period may be (but is not limited to) a hello time defined in the MKA. If Yes, Step S616 is entered; if No, Step S614 is entered.

In Step S614, transmission of any MKPDU is temporarily stopped, and the predetermined transmission period is continuously counted. For example, the timer keeps counting or counting down. It should be noted that in the process of waiting for the timer count to expire, since the communication device may receive MKPDUs from other peer devices, the flow may return to Step S604 in response to a new MKPDU being received.

In Step S616, the second MKPDU is transmitted (e.g. through the second signal).

In this embodiment, a difference between Step S610 and Step S616 is a time point of transmission. That is, in Step S610, since it is not required to wait for the timer count corresponding to the predetermined transmission period to expire, the second MKPDU is transmitted in advance. In Step S616, the method waits for the timer count to expire. As a result, a time interval between the transmission of the second signal and a previous transmission performed by the communication device in Step S610 is less than the predetermined transmission period.

In this embodiment, since operations for transmitting the second MKPDU can be known by referring to the above paragraphs, similar descriptions are not repeated here for brevity.

After the second MKPDU is transmitted (e.g. the Step S610 or the Step S616 is performed), the communication device 100 can stop the timer and then reset it to re-count the predetermined transmission period. In addition, after the second MKPDU is transmitted, no matter whether a predetermined number of information of peer devices has been received, the communication device 100 may establish the CA according to existing information.

According to the third embodiment of the present invention, since the results presented in the timing diagram obtained by applying the method for accelerating the device discovery and identification may be shown in FIG. 4 or FIG. 5, further descriptions are not repeated here. The third embodiment of the present invention does not set another timer to count the waiting time for transmitting the MKPDU in advance, but instead transmits the MKPDU in advance based on the determination of the predetermined number of peer devices having been received (e.g. the determination in step S608).

In summary, by the method for accelerating the device discovery and identification proposed by the present invention, operations of the device discovery and identification in a communication environment can effectively be accelerated, which allows the MACsec standard to be applied to various types of communication environments without causing any unacceptable delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
   a transceiver, arranged to receive a first signal, wherein the first signal comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device; and
   a control circuit, arranged to maintain one or more lists, and determine whether to transmit a second MKPDU in advance according to the first member identifier and the one or more lists;
   wherein when the control circuit determines the first member identifier is not recorded in the one or more lists, the control circuit adds the first member identifier to the one or more lists, and determines to transmit the second MKPDU in advance;
   wherein when the control circuit determines to transmit the second MKPDU in advance, according to the first member identifier and a second member identifier of the communication device, the control circuit sets a plurality of second MKA parameters carried by the second MKPDU, generates the second MKPDU, encodes the second MKPDU to generate a second frame, and transmits a second signal carrying the second frame through the transceiver;
   wherein a time interval between a transmission of the second signal and a previous transmission performed by the transceiver is less than a predetermined transmission period.

2. The communication device of claim 1, wherein the plurality of second MKA parameters further comprise the one or more lists.

3. The communication device of claim 1, wherein the one or more lists comprise a live peer list and a potential peer list; and when the control circuit determines the first member identifier is not recorded in the live peer list and the potential peer list, the control circuit adds the first member identifier to the potential peer list, and determines to transmit the second MKPDU in advance.

4. The communication device of claim 1, wherein the predetermined transmission period is a hello time defined in an MKA.

5. The communication device of claim 1, wherein when the control circuit determines to transmit the second MKPDU in advance, the control circuit immediately sets the plurality of second MKA parameters and immediately generates the second MKPDU and the second frame without considering the predetermined transmission period, and the transceiver immediately transmits the second signal in response to reception of the second frame.

6. The communication device of claim 1, wherein the control circuit is further arranged to set a timer to count a waiting time after the previous transmission performed by the transceiver is completed, the waiting time is shorter than the predetermined transmission period; and when the control circuit determines to transmit the second MKPDU in advance, the second signal is directly transmitted in response to a timer count expiring.

7. The communication device of claim 1, wherein before the control circuit determines to transmit the second MKPDU in advance, the control circuit is further arranged to calculate a number of peer devices recorded in the one or more lists, and the control circuit only determines to transmit the second MKPDU in advance when the number of peer devices reaches a predetermined value.

8. A method for accelerating device discovery and identification, the method comprising:
   receiving a first signal by a communication device, wherein the first signal comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device;
   determining whether the first member identifier is not recorded in one or more lists maintained by the communication device; and
   in response to the first member identifier not being recorded in the one or more lists, adding the first member identifier to the one or more lists, and determining to transmit a second MKPDU in advance;
   wherein in response to the second MKPDU being determined to be transmitted in advance, the method further comprises:
      setting a plurality of second MKA parameters carried by the second MKPDU according to a second member identifier of the communication device and the first member identifier;
      generating the second MKPDU;
      encoding the second MKPDU to generate a second frame; and
      transmitting a second signal carrying the second frame;
      wherein a time interval between a transmission of the second signal and a previous transmission performed by the communication device is less than a predetermined transmission period.

9. The method of claim 8, wherein the plurality of second MKA parameters further comprise the one or more lists.

10. The method of claim 8, wherein the one or more lists comprise a live peer list and a potential peer list; and in response to the first member identifier not being recorded in the live peer list and the potential peer list, the first member identifier is added to the potential peer list, and the second MKPDU is determined to be transmitted in advance.

11. The method of claim 8, wherein the predetermined transmission period is a hello time defined in an MKA.

12. The method of claim 8, wherein in response to the second MKPDU being determined to be transmitted in advance, the plurality of second MKA parameters are immediately set and the second MKPDU and the second frame are immediately generated, and the second signal is immediately transmitted in response to the second frame being generated.

13. The method of claim 8, further comprising:
    setting a timer to count a waiting time after the previous transmission is completed, wherein the waiting time is shorter than the predetermined transmission period;

wherein in response to the second MKPDU being determined to be transmitted in advance, the second signal is directly transmitted in response to a timer count expiring.

14. The method of claim 8, wherein before the second MKPDU is determined to be transmitted in advance, the method further comprises:
    calculating a number of peer devices recorded in the one or more lists; and
    determining whether the number of peer devices reaches a predetermined value, wherein the second MKPDU is only determined to be transmitted in advance in response to the number of peer devices reaching the predetermined value.

15. A method for accelerating device discovery and identification, comprising:
    setting a timer to count a predetermined transmission period;
    receiving one or more first signals by a communication device, wherein each of the one or more first signals comprises a first frame, the first frame comprises a first media access control security key agreement protocol data unit (MKPDU) generated by a first peer device, the first MKPDU carries a plurality of first media access control security key agreement protocol (MKA) parameters set by the first peer device, and the plurality of first MKA parameters comprise a first member identifier of the first peer device;
    updating one or more lists maintained by the communication device according to contents of the one or more first signals;
    calculating a number of peer devices recorded in the one or more lists, and determining whether the number of peer devices reaches a predetermined value; and
    in response to the number of peer devices reaching the predetermined value, determining to transmit a second MKPDU in advance;
    wherein in response to the second MKPDU being determined to be transmitted in advance, the method further comprises:
        setting a plurality of second MKA parameters carried by the second MKPDU according to a second member identifier of the communication device and updated contents of the one or more lists;
        generating the second MKPDU;
        encoding the second MKPDU to generate a second frame; and
        transmitting a second signal carrying the second frame before a timer count expires;
    wherein a time interval between a transmission of the second signal and a previous transmission performed by the communication device is less than the predetermined transmission period.

16. The method of claim 15, further comprising:
    in response to the number of peer devices not reaching the predetermined value, determining not to transmit the second MKPDU in advance.

17. The method of claim 15, wherein the predetermined transmission period is a hello time defined in an MKA.

18. The method of claim 15, wherein the one or more lists comprise a live peer list and a potential peer list, and the method further comprises:
    determining whether the first member identifier is not recorded in the live peer list and the potential peer list; and
    in response to the first member identifier not being recorded in the live peer list and the potential peer list, adding the first member identifier to the potential peer list.

19. The method of claim 15, wherein the one or more lists comprise a live peer list and a potential peer list, and the step of calculating the number of peer devices recorded in the one or more lists further comprises:
    calculating a first number of peer devices recorded in the live peer list;
    calculating a second number of peer devices recorded in the potential peer list; and
    calculating a sum of the first number of peer devices and the second number of peer devices to obtain the number of peer devices recorded in the one or more lists.

20. The method of claim 15, wherein in response to the second MKPDU being determined to be transmitted in advance, the method further comprises:
    stopping the timer; and
    resetting the timer to count the predetermined transmission period after the transmission of the second signal is completed.

* * * * *